Nov. 24, 1931.   E. R. RUMMELL   1,832,999
ANIMAL FEEDING DEVICE
Filed Dec. 6, 1930
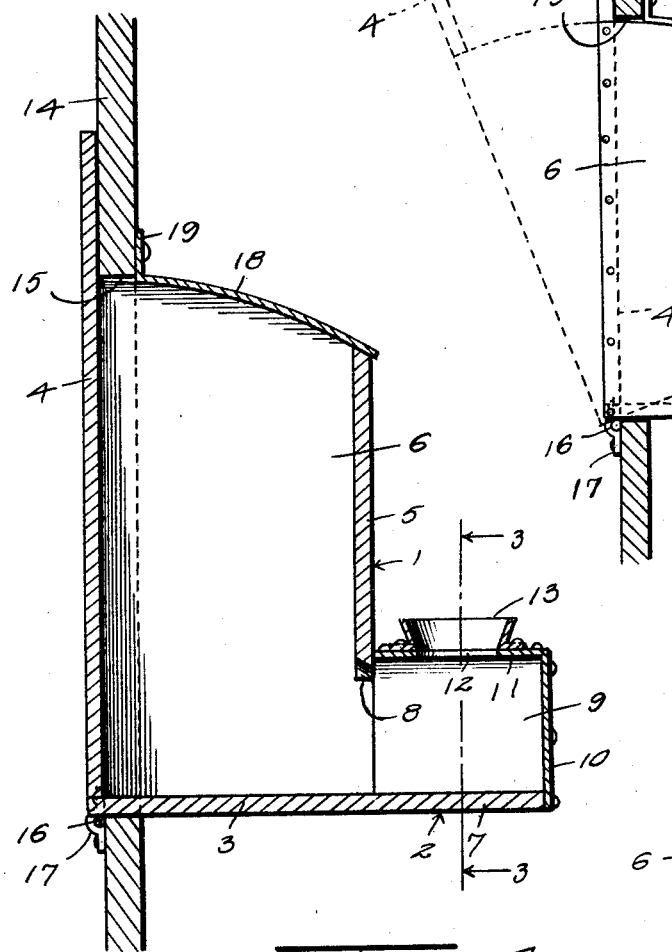
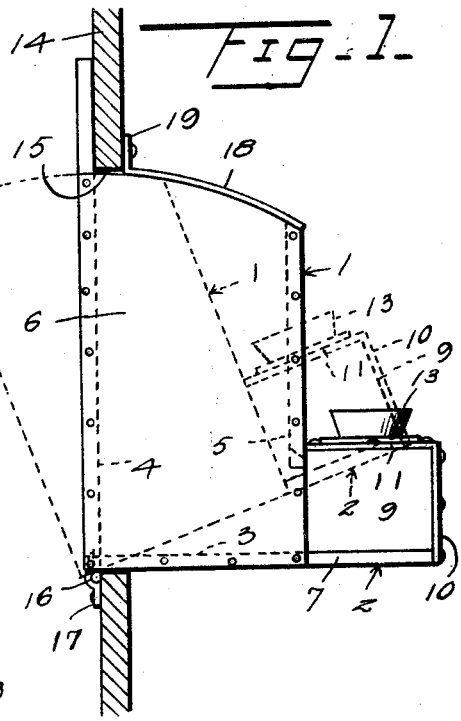
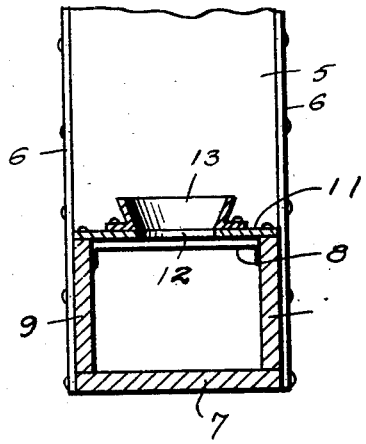
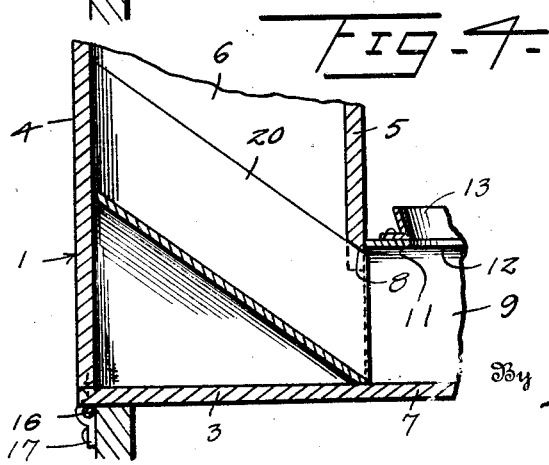
Inventor
E. R. Rummell
By Watson E. Coleman
Attorney Patented Nov. 24, 1931

1,832,999

UNITED STATES PATENT OFFICE

EDSON R. RUMMELL, OF ATWOOD, KANSAS

ANIMAL FEEDING DEVICE

Application filed December 6, 1930. Serial No. 500,615.

This invention relates to a feeding device for animals such as rabbits and the like, and has for one of its objects to provide a novel device of this character through the medium of which animals may be fed whole or ground grain or mash in a manner to prevent them from wasting the feed, which shall be adapted to be mounted in a wall of the animal house in a manner to permit it to be charged with feed from outside the house, and which shall be simple, strong and durable and capable of being manufactured and sold at a comparatively low cost.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a view partly in elevation and partly in vertical section illustrating the application of the feeding device to a wall of a house for rabbits or the like.

Figure 2 is a view with the wall and feeding device in vertical section.

Figure 3 is a sectional view taken on the vertical plane indicated by the line 3—3 of Figure 2, and Figure 4 is a sectional view illustrating a slightly modified form of the feeding device.

The feeding device comprises a hopper or reservoir 1 and a trough 2 of which the latter is located at and extends forwardly from the lower end of the former. The hopper 1 comprises wooden bottom, rear and front walls 3, 4 and 5, respectively, and sheet metal side walls 6. The rear wall 4 rests upon and is secured to the rear end of the bottom wall 3. The front wall 5 is spaced rearwardly from the front end of the bottom wall 3. The side walls 6 are secured to the side edges of the walls 3, 4 and 5. The rear wall 4 extends above the front wall 5 and the side walls 6. The upper edges of the side walls 6 are curved in the direction of the width of such walls, and the upper edge of the front wall 5 is curved transversely and located in alinement with the upper front corners of the side walls. That portion of the bottom wall 3 extending forwardly beyond the front wall 5, constitutes the bottom wall 7 of the trough 2, and the front wall terminates short of such bottom wall so as to provide an opening 8 through which the feed flows from the hopper 1 to the trough. The trough 2 also comprises side walls 9 made from wood, and a front wall 10 and a top wall 11 made from a single piece of sheet metal. The side walls 9 rest upon the bottom wall 7 and bear against the lower end of the front wall 5, and are secured to the bottom and front walls. The front wall 10 bears against the front edges of the bottom wall 7 and side walls 9, and the top wall 11 rests upon the upper edges of the side walls, the walls 10 and 11 being secured to the walls 7 and 9. The top wall 11 is provided with an opening 12 to permit access to the feed in the hopper 2, and extending upwardly from this wall in surrounding relation to the opening therein is an upwardly flaring flange 13 which prevents the wasting of the feed.

The feeding device is adapted to be secured to a wall of the animal house with the hopper 1 and trough 2 extending into the house through an opening in the wall, as shown in Figures 1 and 2, wherein 14 designates the wall and 15 the opening therein. The feeding device is pivoted at the lower rear corner of the hopper 1 to the wall 14 so as to permit the hopper to be swung outwardly with respect to the wall. The pivotal connection between the feeding device and the wall 14 is established through the medium of a rod 16 fixed to the rear end of the bottom wall 3 of the hopper 1 and bearings 17 secured to the outer side of the wall 14 of the house, the ends of the pivot rod extending beyond the sides of the feeding device and journaled in the bearings. That portion of the rear wall 4 of the hopper 1 extending above the side walls 6 of the hopper, contacts with the outer side of the wall 4 of the house and constitutes a stop which limits the inward movement of the feeding device and supports it in an upright position. A closure 18 for the upper end of the hopper 1 is made from sheet metal and is secured to and extends inwardly from the inner side of the wall 14 of the house. The closure 18 is curved longitudinally to conform to the curvature of the upper edges of the hopper walls 5 and 6, and is provided at its outer end with an upstanding flange 19 through the medium of which it is secured to the wall 14 of the house.

The feeding device as thus far described is adapted to be used for the purpose of feeding whole and ground grain to the animals. When it is to be used for the purpose of feeding mash to the animals, a chute is placed in the hopper 1 to convey the mash from the hopper to the trough 2. The chute 20 is made from sheet metal and is of U-form in cross section. The chute 20 is located in the lower end of the hopper 1 and inclines downwardly and forwardly from the rear wall 4 of the hopper to the trough 2.

The feeding device is supported on the wall 14 of the animal house slightly above the floor of the house, and the trough 2 is spaced inwardly from said wall, so as to permit the animals to have ready access to the trough. As the feeding device is pivotally supported upon the wall 14 of the house, it may be swung outwardly of the wall when it is desired to fill the hopper 1. After the hopper 1 has been filled and the feeding device shoved inwardly of the wall 14 of the house, the feeding device will maintain this position for the reason that its weight and the weight of the feed is located inwardly beyond its pivot 16. The closure 18 for the hopper 1 rests upon the upper edges of the hopper walls 5 and 6, and as it and these wall edges are curved, the closure will not interfere with the movement of the feeding device inwardly or outwardly of the wall 14 of the house. The extended upper end of the hopper wall 4 not only forms a stop for limiting the inward movement of the feeding device but it also provides means through the medium of which the feeding device may be drawn outwardly and held while the hopper is being filled.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

1. A feeding device for animals, comprising a hopper consisting of bottom, rear, front and side walls, the upper edges of the side and front walls being curved and the bottom wall extending beyond the front wall and the rear wall extending above the front and side walls, side walls positioned upon the extension of the bottom wall and against the front wall, integrally formed front and top walls secured to said extension and said last side walls and co-operating therewith to provide a trough, the top wall of the trough being provided with an opening and having secured thereto about the opening an upwardly flaring flange, a support, means adapted to pivot the lower rear corner of the hopper to the support, the extension of the rear wall of the hopper being adapted to contact with the support to limit the pivotal movement of the hopper in one direction, and a closure for the upper end of the hopper secured to the support and curved to conform to the curvature of the upper edges of the side and front walls of the hopper.

2. A feeding device for animals, comprising a hopper consisting of bottom, rear, front and side walls, the upper edges of the side and front walls being curved and the bottom wall extending beyond the front wall and the rear wall extending above the front and side walls, side walls positioned upon the extension of the bottom wall and against the front wall, integrally formed front and top walls secured to said extension and said last side walls and co-operating therewith to provide a trough, the top wall of the trough being provided with an opening and having secured thereto about the opening an upwardly flaring flange, a support, means adapted to pivot the lower rear corner of the hopper to the support, the extension of the rear wall of the hopper being adapted to contact with the support to limit the pivotal movement of the hopper in one direction, a closure for the upper end of the hopper secured to the support and curved to conform to the curvature of the upper edges of the side and front walls of the hopper, and a chute arranged in the lower end of the hopper and extending downwardly and forwardly from the rear wall of the hopper to the trough.

In testimony whereof I hereunto affix my signature.

EDSON R. RUMMELL.